US008243998B2

(12) United States Patent
Berkovich et al.

(10) Patent No.: US 8,243,998 B2
(45) Date of Patent: Aug. 14, 2012

(54) REPEATING BAND PRINT ARTIFACT EVALUATION

(75) Inventors: Alexander Berkovich, Haifa (IL); Hila Nachlieli, Haifa (IL); Shai Emanueli, Rehovot (IL); Haim Vladomirski, Rehovot (IL); Michael Plotkin, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 373 days.

(21) Appl. No.: 12/749,739

(22) Filed: Mar. 30, 2010

(65) Prior Publication Data

US 2011/0243393 A1 Oct. 6, 2011

(51) Int. Cl.
*G06K 9/00* (2006.01)
*B41J 2/45* (2006.01)
(52) U.S. Cl. ............... 382/112; 382/275; 347/238
(58) Field of Classification Search .......... 382/100, 382/112–113, 135–140, 162, 168, 181, 191, 382/199–203, 209, 232, 254–266, 274–276, 382/286–294, 305, 312, 321; 358/1.9; 347/14, 347/238; 101/211
See application file for complete search history.

(56) References Cited

U.S. PATENT DOCUMENTS

| | | | | |
|---|---|---|---|---|
| 5,182,990 A | * | 2/1993 | Kline et al. | 101/211 |
| 5,831,659 A | * | 11/1998 | Baek et al. | 347/238 |
| 6,585,341 B1 | * | 7/2003 | Walker et al. | 347/14 |
| 7,003,174 B2 | * | 2/2006 | Kryukov et al. | 382/266 |
| 7,031,021 B1 | * | 4/2006 | Lain et al. | 358/1.9 |
| 2001/0039892 A1 | * | 11/2001 | Frossard et al. | 101/228 |
| 2009/0040261 A1 | | 2/2009 | Zhang et al. | |

OTHER PUBLICATIONS

Jan P. Allebach; Guo-Yau Lin; Cheng-Lun Chen; Farhan A. Baqai; Je-Ho Lee; George T.-C. Chiu, "Image Analysis as a Tool for Printer Characterization and Halftoning Algorithm Development", Fifth IEEE Southwest Symposium on Image Analysis and Interpretation (SSIAI'02), 2002, pp. 3-8, IEEE, US.
Anil K. Jain, "Image Perception", Chapter 3 of Fundamentals of Digital Image Processing, Sep. 23, 1988, pp. 49-79, Prentice Hall, Englewood Cliffs, New Jersey, US.
John C. Briggs; Mike Murphy; Yichuan Pan, "Banding Characterization for Inkjet Printing", IS&T's PICS 2000 Image Processing, Image Quality, Image Capture Systems Conference, Mar. 26-29, 2000, Portland, OR, US.

* cited by examiner

*Primary Examiner* — Seyed Azarian

(57) ABSTRACT

A method and apparatus are provided for evaluating the severity in a printed image of a repeating band print artifact. After electronically capturing the printed image, each of a plurality of patches taken from captured image is analysed to produce an artifact severity measure for the patch; an overall artifact severity value is then determined for the printed image from the patch severity measures. The analysis of each patch involves producing a spatial intensity profile across the patch substantially at right angles to an expected direction of extent of any repeating band print artifact present; a Fourier-related transform is then applied to the spatial intensity profile and the patch artifact severity measure generated by summing the resultant spatial frequency coefficients in a limited range about a frequency of interest.

18 Claims, 7 Drawing Sheets

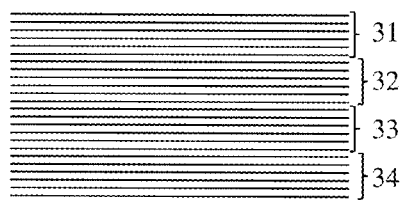
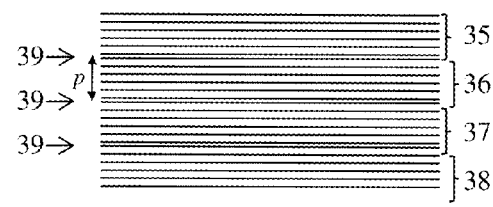
Figure 3A    Figure 3B
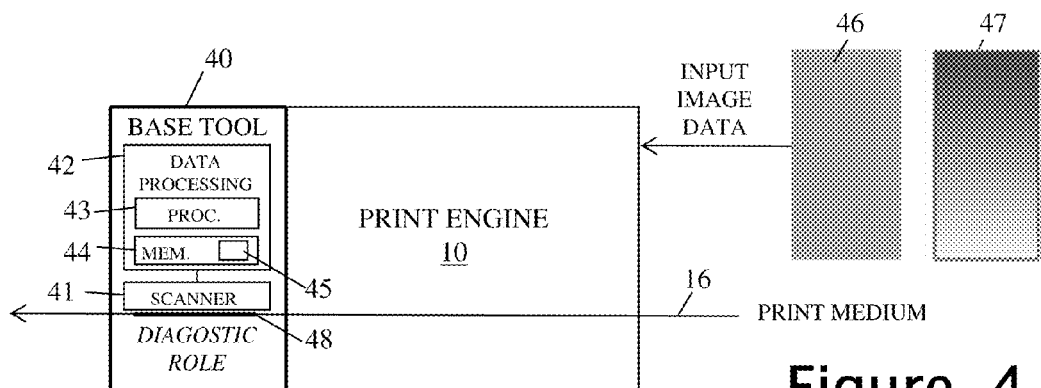
Figure 4
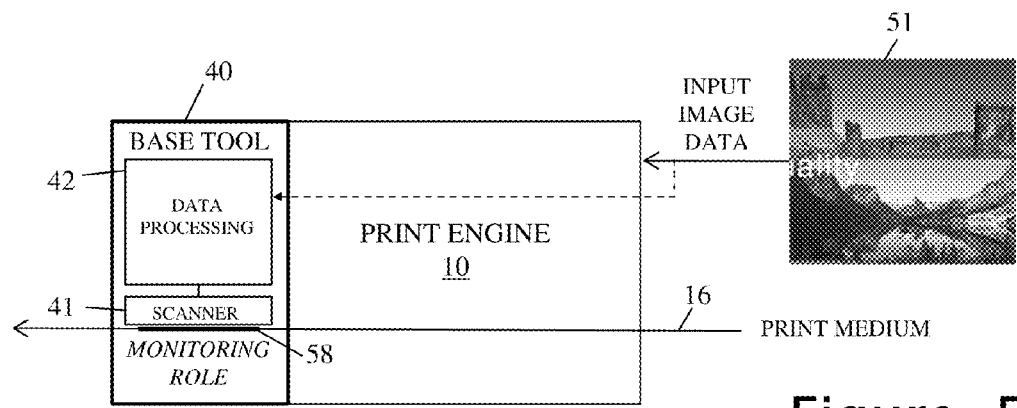
Figure 5

REPEATING BAND PRINT ARTIFACT EVALUATION

BACKGROUND

Fast printing, such as with a digital press, generally involves simultaneously writing multiple pixels; thus for example, the Hewlett-Packard (HP) 'Indigo' presses write in successive swathes of multiple lines of pixels across a photoconductive medium using multiple laser beams in parallel. Perfect seaming between swathes is desired, but not always achieved. When swathe seaming is not perfect, a repeating band artifact may appear in the printed image. This artifact is composed of thin delicate lines across the printed sheet at a pitch which is determined by the physical characteristics of the print engine (for example 0.37 or 0.56 mm) and which tends to corresponds a visible frequency range disturbing to a human looking at the printed image.

SUMMARY OF THE INVENTION

According to the present invention, there is provided a method and apparatus for evaluating repeating band artifact severity as set out in accompanying claims.

BRIEF DESCRIPTION OF THE DRAWINGS

Embodiments of the invention will now be described, by way of non-limiting example, with reference to the accompanying diagrammatic drawings, in which:

FIG. 3A is a diagram illustrating the effect of accurate seaming between successive swathes written on a photoconductive drum of the FIG. 1 print engine;

FIG. 3B is a diagram illustrating a repeating band artifact produced as a result of inaccurate seaming between successive swathes written on the photoconductive drum of the FIG. 1 print engine;

FIG. 4 is a diagram illustrating an example automatic in-line band artifact severity evaluation (BASE) tool embodying the invention, the tool being positioned downstream of the FIG. 1 print engine and set for a diagnostic role;

FIG. 5 is a diagram illustrating the FIG. 4 BASE tool in a print monitoring role;

DETAILED DESCRIPTION

The embodiments of the present invention described below provide for automatic evaluation of the severity of repeating band artifacts on a printed page arising, for example, from inaccurate seaming of swathes written during the printing process. This evaluation is effected by a tool (method and apparatus) that is hereinafter referred to, for brevity, as the BASE (Band Artifact Severity Evaluation) tool. The described exemplary form of BASE tool demonstrates good agreement with human severity evaluation in print quality tests.

The BASE tool is described in the context of an in-line print-engine module for evaluating printed images. Such an in-line BASE module can be used in a diagnostic role to isolate specific customer problems and in this role, predefined test images such as uniform gray scales are used. The in-line BASE module can also be used in a monitoring role evaluating the level of repeating band artifacts in printed customer jobs with a view to initiating corrective action before the artifact becomes readily perceivable to a human.

To facilitate an understanding of how a repeating band artifact may arise, a brief description is given below of a known form of liquid electrostatic printing (LEP) print engine, it being understood that embodiments of the BASE tool of the present invention can be used to evaluate the output of any type of print engine (including inkjet printers as well as laser printers) provided the basic characteristics of the print engine that give rise to the band artifact are known.

Figure 1:
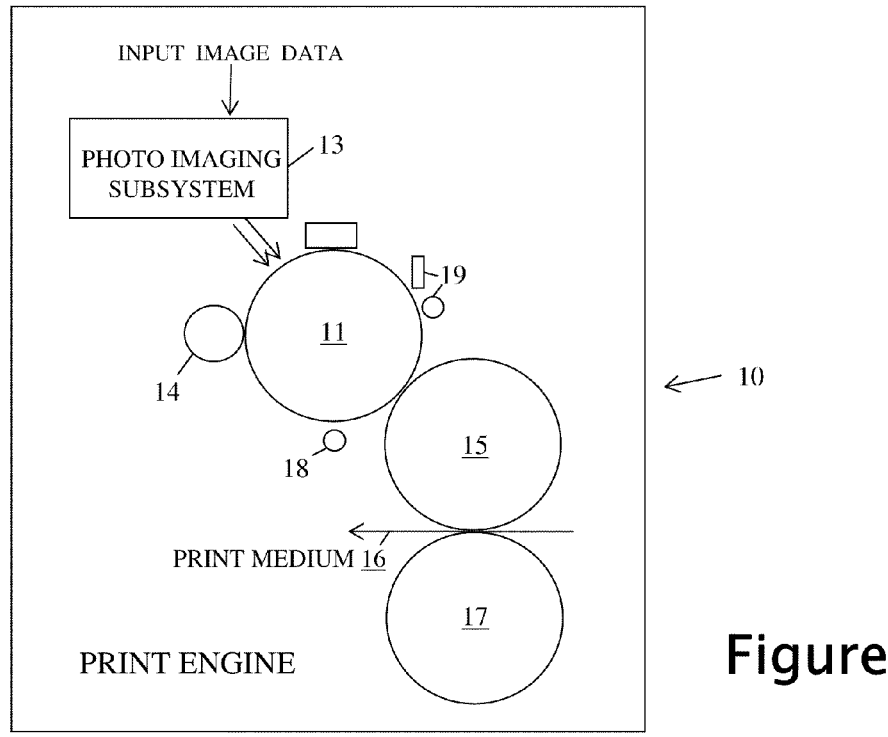
FIG. 1 is a diagram of a known form of electro-photographic print engine.

FIG. 1 is a block diagram illustrating the basic components of an example known LEP print engine 10. In print engine 10 a uniform electrostatic charge is applied, by a charge roller or other suitable charging device 12, to a photoconductive drum 12 (for example, formed by a thin film of photoconductive material, commonly referred to as a photo imaging plate (PIP), wrapped around the outer surface of a cylindrical body). After the drum has been fully charged, a photo imaging sub-system 13 exposes selected areas of the photoconductive drum 11 to light in the pattern of the desired printed image thereby dissipating the charge on the areas exposed to the light. In discharge area development (DAD), for example, the discharged areas on the drum 11 form an electrostatic image which corresponds to the image to be printed. This electrostatic image is said to be a "latent" image because it has not yet been developed into a toner image. A thin layer of liquid toner is then applied to the drum 11 using a developer unit 14, commonly referred to as a binary ink developer (BID), that supplies ink to a small roller that rotates against drum 11.

The latent image on the drum 11 is developed through the application of the liquid toner which adheres to the discharged areas of the drum 11 in a uniform layer developing the latent electrostatic image into a toner image. The toner image is transferred from the drum 11 to an intermediate transfer roller 15 and then from the intermediate transfer roller 15 to a print medium 16 as the latter passes through a nip between the roller 15 and a pressure roller 17. Print medium 16 represents generally any suitable print medium and may be delivered to print engine 10 as a continuous web dispensed from a roll or as individual sheets. An LED lamp or other suitable discharging device 18 removes residual charge from the drum 11 and toner residue is removed at a cleaning station 19 in preparation for developing the next image or for applying the next toner color plane.

Figure 2:
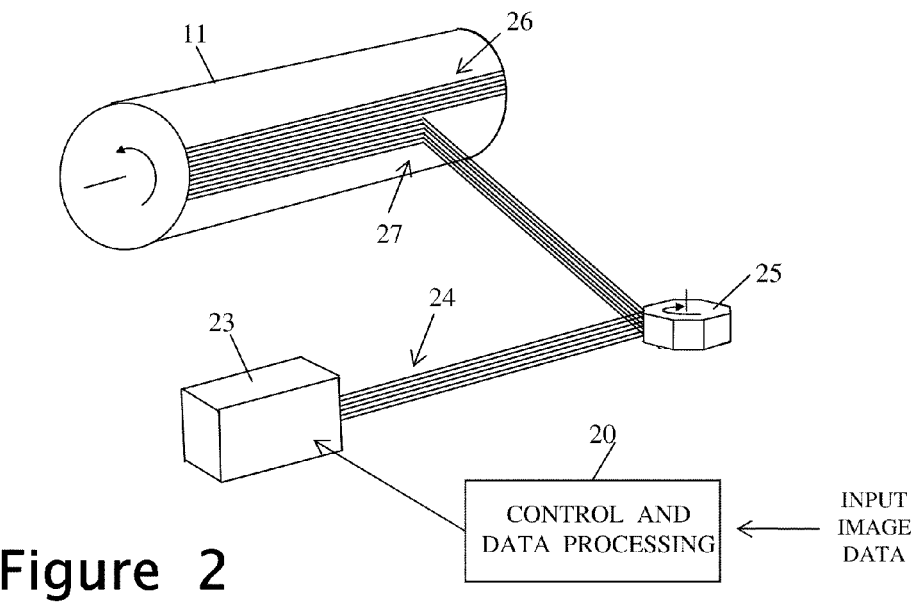
FIG. 2 is a diagram illustrating the general operation of a photo-imaging subsystem of the FIG. 1 print engine.

The main components of the photo-imaging subsystem 13 are depicted in FIG. 2 and comprise:

- a control and processing unit 20 that receives input image data and controls the other components of the imaging subsystem 13 to write a corresponding latent image on the surface of the photoconductive drum 11;
- a bank of lasers 23 (in this example, six in number) that emit parallel light beams 24—the control and processing unit 20 controls the lasers 23 to modulate the emitted beams 24 in dependence on the input image data: and a rotating polygonal mirror 25 that scans the modulated light beams 24 across the surface of the drum in a direction substantially parallel to the axis of the drum 11.

The overall result is that the modulated beams 24 write a latent image on the photoconductive drum 11 in successive swathes of six lines of pixels; in FIG. 2 the swathe currently being written is indicated by arrow 27 and the immediately preceding swathe is indicated by arrow 26. Successive swathes are juxtaposed circumferentially of the drum.

It will be appreciated that, for reasons of clarity, FIG. 2, as well omitting various components such as lenses, greatly exaggerates the spacing between the laser beams 24. In a practical print engine, such as in an HP Indigo digital press, a bank of twelve or eighteen lasers is used and each swathe written to the photoconductive drum 11 is approximately 0.37 or 0.56 mm across (in the circumferential direction of the drum).

The print engine 10 described above with reference to FIGS. 1 and 2 is of conventional form whose structure and operation is well known to those skilled in the art of LEP printing along with many variants (for example, the use of charged area development CAD, in place of discharged area development DAD).

How a repeating band artifact may arise during operation of the print engine 10 will next be explained with reference to FIGS. 3A & 3B. Where the top pixel line written as part of the current swathe 27 is evenly spaced between the second from top pixel line of the current swathe and the bottom pixel line of the preceding swathe 26, the swathes are accurately seamed and no band artifact is produced; this is the situation depicted in FIG. 3A but now for four successive, accurately seamed, swathes 31-34. However, if the swathes are not accurately seamed, band artifacts will be produced as depicted in FIG. 3B for four successive, inaccurately seamed, swathes 35-38; in the illustrated case, the swathes are marginally too close to each other, but other seaming inaccuracies are possible. As can be seen, each inaccurate swathe produces a corresponding repeating band artifact 39 that appears in the printed image. Generally, inaccuracies once present will remain, leading to repeated band artifacts with a pitch p determined by the physical configuration of the photo-imaging subsystem 13. Example values of p are 0.37 mm and 0.56 mm for HP Indigo digital presses with twelve and eighteen write lasers respectively.

The more inaccurate the seaming of the swathes, the more severe will be the repeating band artifact. The BASE tool described below provides a measure of the repeated band artifact occurring in a printed page.

A print engine may generate repeating band print artifacts for causes other than inaccurate seaming of swathes as described above. For example, the print engine 10 may generate a repeating band artifact at the rotational frequency of the polygonal mirror 25 due to misalignments in the print engine. By way of a further example, the print engine 10 may generate a repeating band artifact as a result of non-uniformity of the half-tone spots between rows (for example—due to different laser powers or optical differences). Generally, the BASE tool described below is suitable for evaluating the severity of any specific repeating band print artifact (the 'target' repeating band artifact) arising from a known implementation issue (misalignment, inaccurate set up including of timing parameters, mismatches between paralleled systems such as multiple write lasers, halftone artifacts, etc.) of the print engine. Knowledge of the cause of the target repeating band artifact allows a prior estimate to be made of the expected frequency of the repeating band artifact and this information is used by the BASE tool to facilitate its operation. By way of example, where the target repeating band artifact is caused by inaccurate seaming, it is relatively straightforward to determine from the print engine the pitch and therefore the spatial frequency of the target repeating band artifact; thus, for values of p of 0.37 mm and 0.56 mm, the repeating band artifact will have a spatial frequency of $1/0.37=2.66$ mm$^{-1}$ and $1/0.56=1.77$ mm$^{-1}$ respectively.

Notwithstanding the wide applicability of the BASE tool to the evaluation of repeating band artifacts, in order to facilitate explanation of the BASE tool, in the following description where it is required to be specific about the nature of the repeating band print artifact being evaluated, an artifact resulting from the inaccurate seaming of swathes will be considered.

The example BASE tool embodying the invention is depicted in FIGS. 4 and 5 in the form of an in-line module 40 positioned on the downstream side of the print engine 10 and arranged to evaluate repeating band artifacts that may be present in printed images 48 produced by the print engine 10 on the print medium 16. FIG. 4 depicts the BASE tool 40 in a diagnostic role in which the print engine is fed with predetermined test image data representing, for example as a uniform grayscale image 46 or a grayscale gradient 47. FIG. 5 depicts the BASE tool 40 in a monitoring role in which it monitors customer print jobs such as a color input image 51 (here shown in grayscale) represented by the input image data.

As depicted in FIG. 4, the BASE tool 40 typically comprises a scanner or other image capture device (such as a camera) 41 for electronically capturing a data representation of the printed image of interest 48 (58 in FIG. 5), and a data processing subsystem 42 that will typically be in the form of a program controlled processor 43 and associated memory 44. The memory 44 holds a program 45 for controlling the processor 43 to process the captured printed-image representation such as to evaluate the severity of the target repeating band artifact, if present; the memory 44 also serves as a temporary store both for the captured representation and the processing results. It will be appreciated that the data processing subsystem 42 may take other forms such as dedicated hardware (for example an ASIC or suitable programmed field programmable array).

Figure 6:
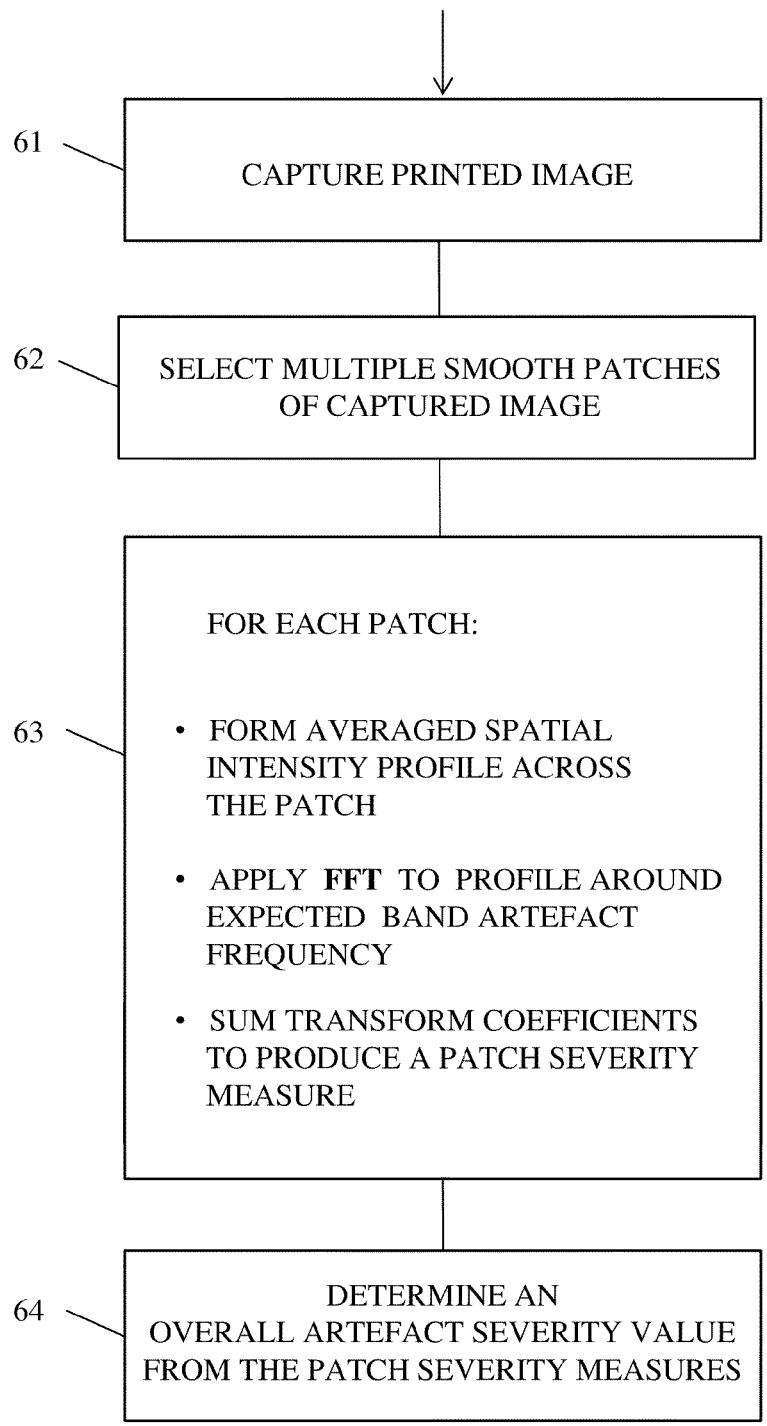
FIG. 6 is a flow chart illustrating an example BASE severity evaluation method embodying the present invention and implemented by the tool shown in FIGS. 4 and 5.

FIG. 6 is a flow chart depicting the steps carried out by the BASE tool 40 in evaluating the severity of a target repeating band artifact in a printed image. In outline, the operation of the BASE tool can be divided into three stages:

Stage 1 The printed image 48 or 58 is electronically captured using the image capture device 41 (step 61) and areas of the captured image, referred to as "patches" below, are selected (step 62) for analysis; these patches being relatively smooth, non-saturated, areas that do not contain image features in the expected frequency range of the target band artifact but where the artifact, if present, is likely to be substantially uniform.

Stage 2 Each patch is individually analysed (step 63) to determine a band artifact severity (BAS) measure for the patch. This analysis involves producing an averaged spatial intensity profile across the patch at right angles to the direction of extent of the band artifact, applying a Fourier-related transform to the spatial intensity profile, and summing the resultant spatial frequency coefficients in a limited range about the expected repeating band artifact frequency to produce a BAS measure for the patch.

Stage 3 The BAS measures of all the selected patches are used to determine (step 64) an overall artifact severity value for the printed image being evaluated.

Each stage will now be described in greater detail.

Stage 1—Pre-Processing

First, the printed image 48 or 58 is captured (step 61) by the image capture device 41 and registered using fiducial marks on the boundaries of the printed image and therefore also of the captured image (the edge of the medium can alternatively be used as a registration reference). Color images are converted to gray scale.

As the artifact bands, if present, will be slightly diagonal, and as the severity of the band artifact may vary across the printed image, small, non-overlapping, areas (patches) are selected (step 62) from the captured image. These patches are be big enough to contain several wavelengths of the repeating band artifact to be evaluated but small enough that the band artifact's severity is substantially constant over the patch. Furthermore, the patches should be relatively smooth, non-saturated, areas that do not contain image features in the expected frequency range of the band artifact.

Figure 7:
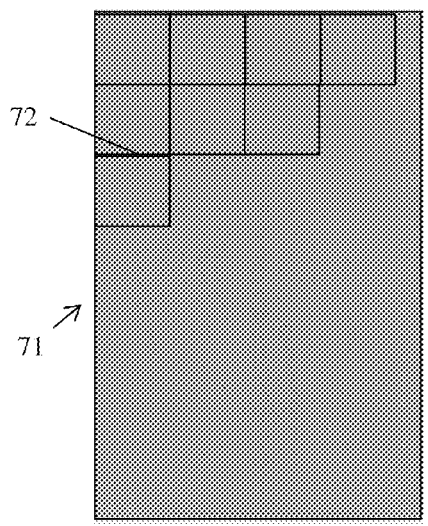
FIG. 7 is a diagram illustrating the division into patches of a captured grayscale test image.

Patch selection is straightforward for the predetermined test images used for diagnosis (FIG. 4) since the characteristics of the original input image are well known and are such that they do not contain image features in the expected frequency range of the band artifact. For the uniform grayscale test image 46, the whole captured image can be used for patches and FIG. 7 illustrates the division of a corresponding captured image 71 into non-overlapping patches 72 (for clarity, only some of the patches are shown). By way of example, for a multi mega-pixel uniform grayscale test image printed with dpi=300, the captured image can be divided into 500× 800 pixel patches.

Figure 8A:
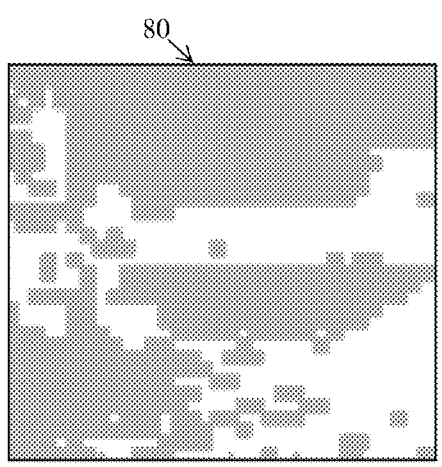
FIG. 8 is a diagram illustrating patch selection for a captured customer print job image.
Figure 8B:
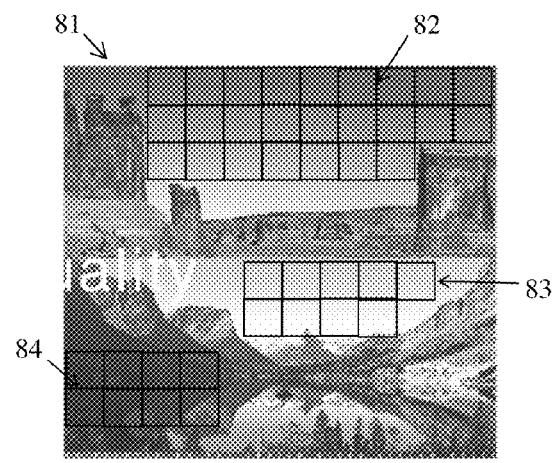

Patch selection is more complicated for an arbitrary costumer job (the FIG. 5 monitoring role of the BASE tool). In this case, regions of the captured image suitable for providing patches are determined based on the original input image data supplied to the print engine 10 (see dashed arrow in FIG. 5). If the band artifact severity evaluation is simply based on the content of the whole image, it will not match a human evaluation, both because people do not see band artifacts in regions masked by the content of the image, and because human evaluations are affected by the surrounding image content. The useful image regions are determined from the original input image. These regions are smooth, their color is in the middle of the dynamic range, and possess negligible content features around the expected frequency of the band artifact under evaluation. Patches for analysis are then taken from the corresponding regions of the captured images. Large smooth regions in customer jobs are rare, so smaller patches are typically used, for example 100×100 pixels. By way of illustration, FIG. 8A shows the distribution 80 of smooth regions of the customer-job image shown in FIG. 5 (the smooth regions being depicted in gray). FIG. 8B shows two groups of patches 82, 83 selected in the grayscale image 81 captured from the printed image corresponding to the original image 52; as can been seen, the patches have been selected from the smooth regions of the image.

It will be appreciated that in FIGS. 7 and 8 the patches have been shown larger than would be used in practice simply for clarity of illustration.

Determination of which regions of an original print-job image are smooth is effected as follows. Let x be the gray values of all the pixels in a current block, stacked to be a single vector. A 'standard median' value Std_med is derived as:

$$Std\_med = (median(x - median(x)^2))^{0.5}$$

which is similar to the usual standard deviation formula but with 'median' instead of the 'mean'. If Std_med has a value that is greater than a certain threshold, then the block is not smooth. By way of example, a threshold value of 12 can be used, though different values can alternatively be used.

It will be appreciated that rather than first identifying regions of the original image that are smooth and possess negligible content features around the expected band artifact frequency and then dividing these regions into patches, it would alternatively be possible to divide the original image into patches and then test each patch for smoothness and lack of features around the expected band artifact frequency.

Stage 2—Individual Patch Processing

Figure 9:
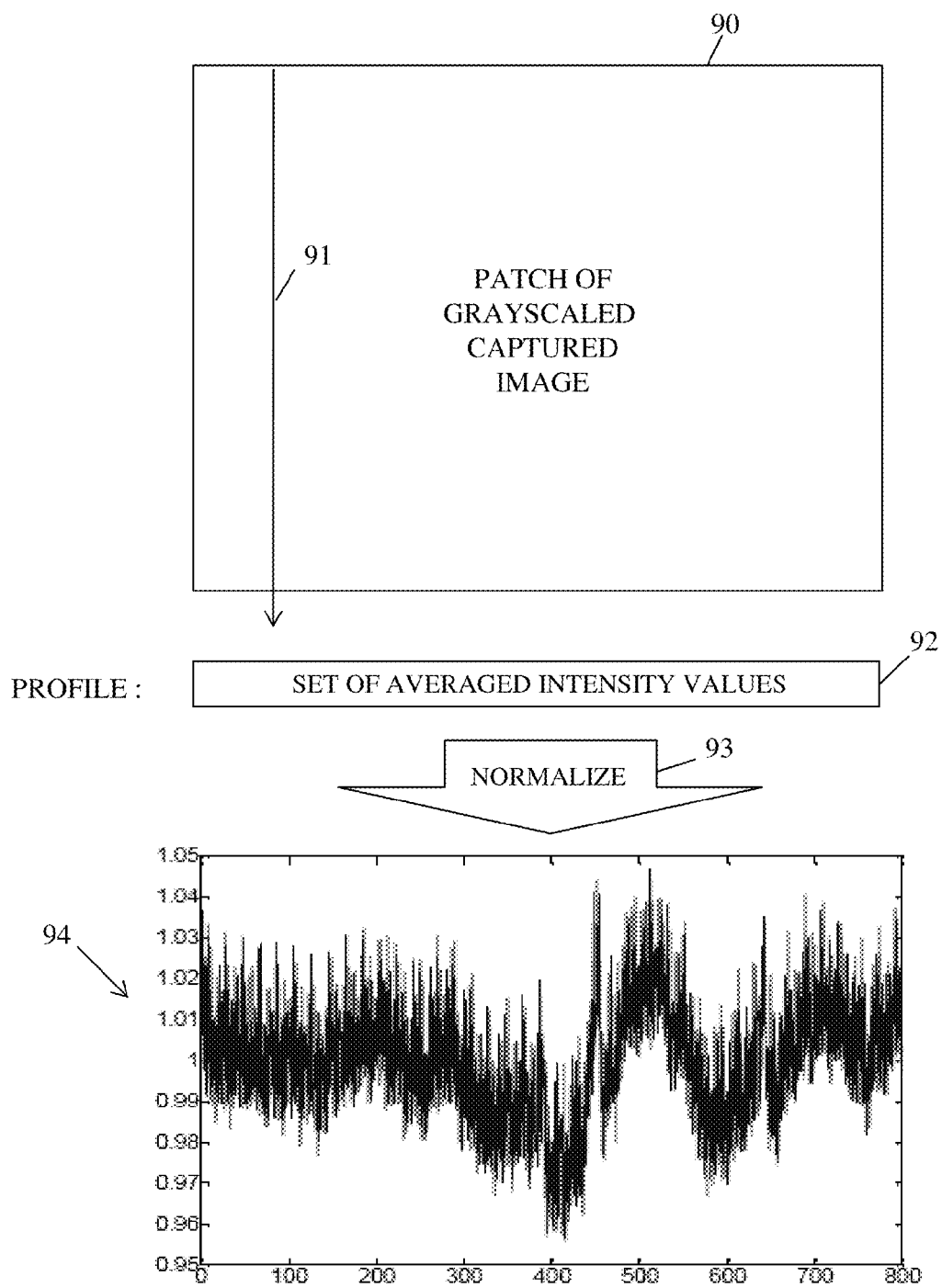
FIG. 9 is a diagram illustrating generation of a normalized averaged intensity profile of a patch.

This stage derives a measure for each patch of the severity of the target repeating band artifact in the patch (step 63 of FIG. 6). First, an averaged spatial intensity profile is derived for the patch, taken across the patch at right angles to the direction of the target band artifact (for a band artifact produced by inaccurate swathe seaming, the direction of the band artifact corresponds to the direction of writing of swathes as translated to the captured image). As a consequence of dividing the captured image into small patches, any band artifact present can be treated as being straight across the image. Therefore, to calculate the profile of the patch, an average intensity value is derived for each line of pixels extending straight across the patch (that is, substantially in the direction of extent of the repeating band artifact). This is illustrated in FIG. 9 where arrow 91 indicates the direction of each pixel line across the patch 90. A 2D patch of the size [r×s] is now represented by a 1D vector [r×1]—in FIG. 9 this is represented by the set 92 of averaged intensity values. The 1D vector (set 92) is the raw profile of the patch 90. This profile is then normalized (arrow 93) by dividing by the average gray level (intensity) of the patch in order to attach the same weight to all of the patches. An example normalized profile is depicted in graph 94 of FIG. 9.

Next, the normalized patch profile is subject to a Fourier analysis to identify spatial frequency components around the expected frequency of the target repeating band artifact. For this the Fast Fourier Transform, FFT, (which is the fast implementation of the Discrete Fourier Transform) can be used; other Fourier-related transforms such as the Discrete Time Fourier Transform, DTFT, can alternatively be used. The FFT is applied to the normalized profile in a range of frequencies around the expected frequency of the target repeating band artifact. Only the absolute value of the FFT is considered, and due to the properties of the FFT, the DC and right half of the result are ignored.

Figure 10:
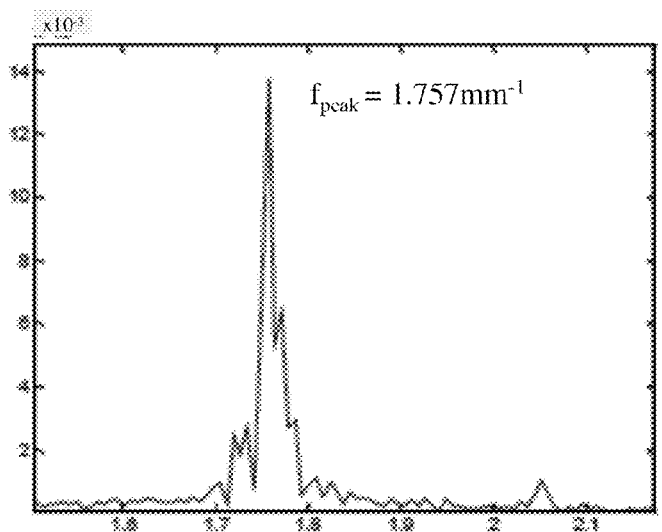
FIG. 10 is a graph of the results of a Fourier analysis of a patch profile.

By way of example, FIG. 10 shows the result of applying the FFT to the normalized profile shown in graph 94 of FIG. 9. The theoretical repeating band artifact frequency for the print engine used for this example is $f=1.77$ mm$^{-1}$; it can be seen that the actual peak frequency in FIG. 10 ($f=1.76$ mm$^{-1}$) is slightly shifted relative to the theoretical repeating band artifact frequency. It can also be observed that the shifted peak is not sharp, the repeating band artifact also showing in frequencies around the band artifact frequency.

The BASE tool 40 operates on the assumption that there is a direct relation between the repeating band artifact severity of a patch and the coefficient of the artifact's peak frequency in the Fourier domain. A severity measure for the artifact can therefore be derived in respect of the current patch by taking the coefficient of the artifact's frequency. However, in view of the above-noted shifting and spreading of the expected peak frequency of the artifact, the severity measure for the patch is preferably based on the sum of the Fourier coefficients in a small range around the peak frequency. The reasoning behind this approach is as follows: if the peak is not clear at some frequency, it means that the frequency of the target repeating band artifact is not constant throughout the image. This change in frequency is too small to be perceived by human observers, but may affect the automatic BASE tool 40, since the peak at the expected repeating band artifact frequency may be small, but the perceived repeating band artifact may be significant. The range of the frequencies over which coefficients are summed should not be too large as distinct peaks at nearby frequencies should be excluded. A typical range is around 0.1 [cycle/mm] to each side of the expected frequency. For example, for an expected artifact frequency of 1.77 mm$^{-1}$, a suitable summation range would be 1.688 mm$^{-1}$ to 1.866 mm$^{-1}$ (that is, a range of 0.2 mm$^{-1}$)

Stage 3—Overall Artifact Severity Value of Printed Image

This stage of operation of the BASE tool (step 64 of FIG. 6) returns a single value for the severity of the target repeating band artifact for the printed image under consideration. Typically, different patches of the same image will have different values of severity measure; however, as a practical matter, it is desirable to have only one value representing the band artifact severity for the image. It has been found that taking the 80-percentile (meaning the patch severity measure that is bigger than 80% of the other patch severity measures for the same image) or similar percentile figure, is a good indicator for the artifact severity of the printed image relative to other such images. This conclusion was reached using training data covering different digital presses, differing percentage coverages, and a variety of colors—black, cyan, magenta and yellow. Other ways of deriving an overall artifact severity value for a printed image from the individual patch artifact severity measures, are possible including taking the median value.

The band artifact severity values derived for various printed images by the BASE tool 40 in its diagnosis and monitoring roles were compared with artifact severity values assessed by a committee of human experts. This comparison test was effected as follows.

For each of a number of comparison-test images, the original image data was printed with ten different machine setups giving different degrees of swathe seaming inaccuracy; this resulted in ten sample printed images with different severities of repeated band artifact. A committee of twenty five experts then ranked the ten images according to their perception of the severity of the repeating band artifact. These twenty five rankings were then compared with a tool-based ranking derived by ranking the artifact severity values generated for the same ten sample printed images using the BASE tool.

The comparison of the various rankings (both expert-based and tool-based) was carried out using the Spearman correlation to obtain a correlation value between any two given rankings. The correlation value is of course a number between 1 and −1, where '1' means a perfect correlation and '−1' means that the rankings are the opposite of each other. For each member of the committee of experts, the ranking produced by that member was correlated with each of the rankings produced by the other committee members to produce a set of Spearman correlations which were then averaged to determine a rank agreement measure (RAM) for that member. By way of example, for the ranking produced by the second member of a committee of N experts:

$$RAM_{(Ranking2)} = \frac{1}{(N-1)} \sum_{i=1}^{(N-1)} C_i$$

where $C_i$ is the Spearman correlation between the second-member ranking and the i$^{th}$ other member of the committee (there being N−1 such other members).

Figure 11:
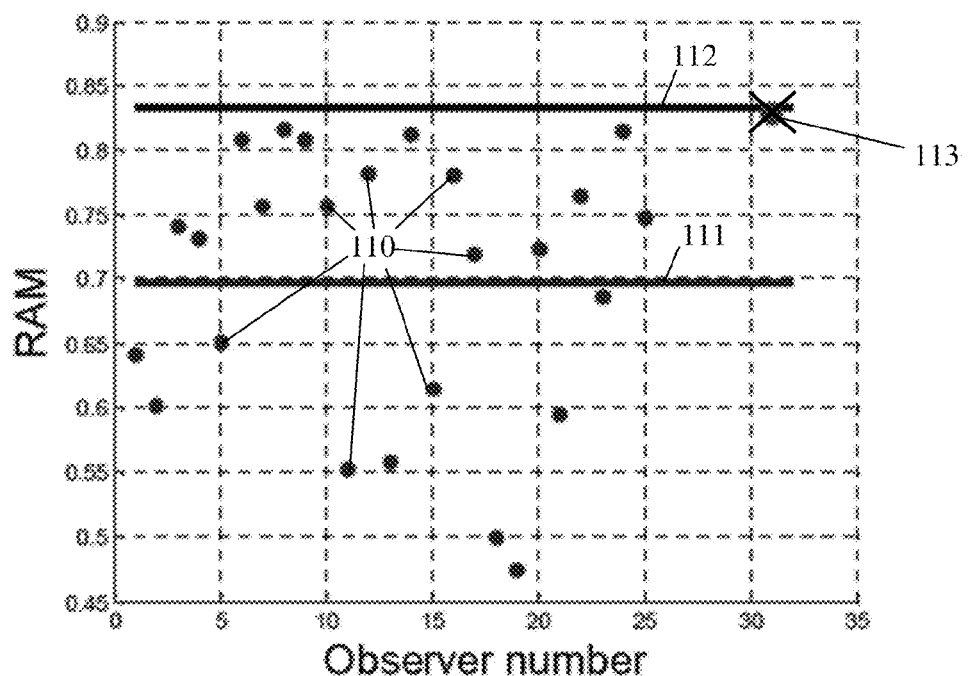
FIG. 11 is a graph comparing band artifact evaluations carried out by the BASE tool and human experts.

By way of example, the comparison test results for a comparison-test image in the form of a uniform grayscale (such as the image 46 in FIG. 4) are shown FIG. 11. In the graph shown in FIG. 11 the RAM of each member is plotted against the member number (dots 110). The lower horizontal line 111 is the average RAM of the committee members (0.69). The upper horizontal line 112 is the highest RAM for this committee (0.83), the corresponding ranking being the one that best agrees with the overall committee judgment. The crossed dot 113 is the RAM (0.829) produced by comparing the tool-based ranking with the expert-based rankings; this high mean correlation between the tool rank and each of the ranks of the human evaluators is close to the optimal possible value. Moreover, the agreement between the tool and each one of the committee members is better than the mean agreement between each two committee members.

Similar results were obtained for other comparison-test images, including customer-job type images (such as the image 51 in FIG. 5). In general, the agreement of the BASE tool with human evaluators is better than the average agreement between the human evaluators. It can therefore be concluded that the BASE tool 40 can replace human experts in evaluating specific repeating band artifacts.

It will be appreciated that many variations are possible to the above described form of BASE tool 40. For example, converting the captured image to grayscale, while convenient, can be omitted or substituted. Furthermore, the test images used when operating the BASE tool in its diagnostic role may differ from the uniform grayscale and gradient images 46, and 47 depicted in FIG. 4; a test image should, however, have one or more known regions that are relatively smooth, non-saturated, and free of features exhibiting a spatial frequency around the expected frequency of the target repeating band artifact, thereby enabling the patches to be taken from the known regions without the need for analysis.

As already indicated, in Step 63 (FIG. 3) rather than using the DFT (implemented using a FFT algorithm), other Fourier-related transforms can be used, in particular, the Discrete Time Fourier Transform, DTFT. The relationship between the DFT and the DTFT in the present context is as follows.

As is well known, the Discrete Fourier Transform, DFT, transforms a given vector x of N values $x_0, \ldots, x_{N-1}$ (for example, a discrete, i.e. sampled, representation of a signal in the time domain) into a vector X of N complex numbers $X_0, \ldots, X_{N-1}$ (for example, in the frequency domain) according to the formula:

$$X_k = \sum_{n=0}^{N-1} x_n e^{-\frac{2\pi i}{N}kn} \quad k = 0, \ldots, N-1$$

where i is the imaginary unit and $$e^{\frac{2\pi i}{N}}$$

is a primitive N$^{th}$ root of unity. The elements of X are the coefficients of the frequencies of x in the Fourier domain; in other words, X is the spectral decomposition of x in a range of frequencies. The DFT is typically calculated using a Fast Fourier Transform, FFT, algorithm.

The coefficients of the frequencies of x calculated using the DFT are often not accurate. For an input that is both discrete and periodic, the Discrete Time Fourier Transform, DTFT, can be used to obtain more accurate coefficients. For present purposes, the DTFT of the vector x may be defined as:

$$X(\omega) = \sum_{n=0}^{N-1} x(n)e^{-i\omega n}$$

ω is related to the frequency f of the signal as follows:

$$\omega = 2\pi \cdot f \cdot T_S$$

where $T_S$ is the reciprocal of the dots per millimeter resolution at which the printed image under evaluation was captured. The DTFT can be used to yield the frequency coefficient of a single frequency.

In the present context, in using the DTFT in step 63 (FIG. 3) in place of the FFT, a determination is made of the coefficients of several frequencies around the expected frequency of the repeating artifact as calculated from the parameters of the print engine. Thus, if the expected frequency is $f_E$, (with a corresponding value for ω of $\omega_E$ as determined using the above formula), coefficients are found for:

$$\omega_E \pm \Delta \cdot m, \Delta = 0.01, m = 1, \ldots, 20$$

Figure 12:
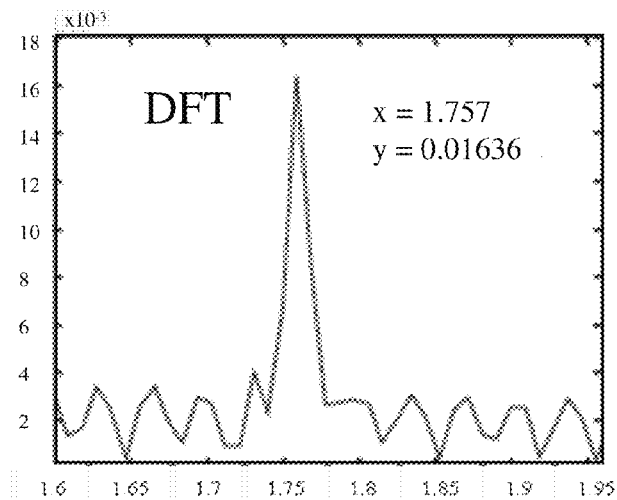
FIG. 12 is a graph of the normalized results from analyzing a patch profile using the Discrete Fourier Transform.
Figure 13:
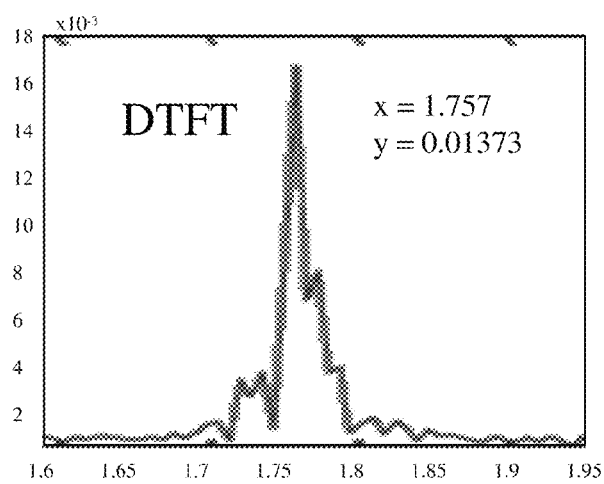
FIG. 13 is a graph of the normalized results from analyzing the same patch profile as in FIG. 12 using the Discrete Time Fourier Transform.

FIGS. 12 and 13 show, by way of comparison, normalized results obtained using the DFT and the DFTF respectively, for the coefficients around the central peak frequency in respect of the same example to which FIG. 10 relates.

As already indicated, the described BASE tool can be applied for evaluating the severity of repeating band print artifacts resulting from a variety of causes and produced by different printing technologies (for example, laser printing, inkjet printing, etc). The tool is useful in many scenarios and applications. It is helpful in R&D efforts towards reducing and eliminating the source of artifacts, in alpha and beta tests to evaluate repeating band artifact severity, and in production, to block presses with severe repeating band artifact from reaching the customers.

The described BASE tool is not limited to evaluating the severity of repeating band print artifacts of known cause and thus whose expected frequency is also known. The BASE tool can also be used to detect previously unknown repeating band print artifacts within a given frequency range by analysing the normalized profile for each patch at each of a plurality of frequencies across the given frequency range to produce a repeating-band-print-artifact severity measure for the patch at each frequency (in this process, an expected direction of extent of any repeating band print artifact present in the image is assumed, the profile being at right angles to this direction). Thereafter, an overall artifact severity value is determined at each frequency from the corresponding patch severity measures. A plot can then be produced of the overall artifact severity value for the image against frequency for user analysis, and/or an automatic thresholding technique applied to determine the frequencies at which the severity value exceeded a predetermined level indicating the probable presence of a repeating band print artifact.

The invention claimed is:

1. A method of evaluating the severity in a printed image of a repeating band print artifact, the method comprising:
   electronically capturing the printed image to form a captured image;
   for each of a plurality of patches taken from one or more selected regions of the captured image:
   producing a spatial intensity profile across the patch substantially at right angles to an expected direction of extent of any repeating band print artifact present in the captured image;
   applying a Fourier-related transform to the spatial intensity profile and summing the resultant spatial frequency coefficients in a limited range about a frequency of interest to produce a repeating-band-print-artifact severity measure for the patch at that frequency; and
   determining an overall artifact severity value at the frequency of interest from the severity measures of said plurality of patches.

2. A method according to claim 1, wherein the method is used to evaluate the severity of a target repeating band print artifact caused by a known print engine implementation issue, said expected direction of extent being that of the target repeating band print artifact and said frequency of interest being the expected frequency of the target repeating band print artifact.

3. A method according to claim 2, wherein the target repeating band print artifact is caused by inaccurate seaming between successive swathes written by a print engine in the course of producing the printed image, the direction of extent of the target repeating band print artifact in the captured image being parallel to the direction of writing of said swathes as translated to the captured image.

4. A method according to claim 1, wherein the method is used to look for repeating band print artifacts in a predetermined frequency range, the operations of applying a Fourier-related transform for each patch to produce a severity measure for the patch, and of determining an overall artifact severity value being effected for multiple different frequencies of interest across said predetermined frequency range.

5. A method according to claim 1, wherein the captured image is formed as a grayscale image.

6. A method according to claim 1, wherein the size of each patch is big enough to contain several wavelengths of a repeating band artifact at the frequency of interest, but small enough that the severity of the repeating band artifact is substantially constant over the patch.

7. A method according to claim 6, wherein the printed image is printed from input image data representing a predetermined test image with one or more known regions that are relatively smooth, non-saturated, and are free of features exhibiting a spatial frequency around the frequency of interest; the patches being taking from said one or more known regions.

8. A method according to claim 6, wherein the printed image is printed from input image data representing a arbitrary print job, the method involving analysing the input image data to identify regions that are relatively smooth, non-saturated, and free of features exhibiting a spatial frequency around the frequency of interest; the patches being taking from one or more regions so identified.

9. A method according to claim 1, wherein the spatial intensity profile of a patch is produced as a set of averaged intensities each taken across the patch along a line substantially parallel to said expected direction of extent of any target repeating band print artifact in the captured image, the lines along which the averaged intensities are taken being spaced in a direction across the patch substantially at right angles to said expected direction of extent artifact.

10. A method according to claim 1, wherein the Fourier-related transform applied to each patch profile is the Discrete Fourier Transform or the Discrete Time Fourier Transform.

11. A method according to claim 1, wherein the overall artifact severity value is determined as the 80-percentile patch severity measure.

12. A printing system comprising a print engine, and apparatus according to claim 11 arranged as an in-line module to evaluate the severity of a target repeating band print artifact in print images as they are output by the print engine.

13. Apparatus for evaluating the severity in a printed image of a repeating band print artifact, the apparatus comprising:
- an image capture device for electronically capturing the printed image to form a captured image; and
- a processing subsystem arranged to select a plurality of patches from the captured image and to process each patch by:
  - producing a spatial intensity profile across the patch substantially at right angles to an expected direction of extent of any target repeating band print artifact present in the captured image; and
  - applying a Fourier-related transform to the spatial intensity profile and summing the resultant spatial frequency coefficients in a limited range about a frequency of interest artifact to produce a repeating-band-print-artifact severity measure for the patch at that frequency;
- the processing subsystem being further arranged to determine from the severity measures of said plurality of patches, an overall artifact severity value at the frequency of interest for the printed image.

14. Apparatus according to claim 13, wherein the apparatus is arranged to evaluate the severity of a target repeating band print artifact caused by a known print engine implementation issue, said expected direction of extent being that of the target repeating band print artifact and said frequency of interest being the expected frequency of the target repeating band print artifact.

15. Apparatus according to claim 13, wherein the processing subsystem is arranged to select patches each of a size big enough to contain several wavelengths of a repeating band artifact at the frequency of interest, but small enough that the severity of the repeating band artifact is substantially constant over the patch.

16. Apparatus according to claim 15, wherein the printed image is printed from input image data representing a arbitrary print job, the processing subsystem being arranged to analyse the input image data to identify regions that are relatively smooth, non-saturated, and free of features exhibiting a spatial frequency around the frequency of interest; and the processing subsystem being further arranged to select the patches from one or more regions so identified.

17. Apparatus according to claim 13, wherein the processing subsystem is arranged to produce the spatial intensity profile of a patch as a set of averaged intensities each taken across the patch along a line substantially parallel to said expected direction of extent of any target repeating band print artifact in the captured image, the lines along which the averaged intensities are taken being spaced in a direction across the patch substantially at right angles to said expected direction of extent artifact.

18. Apparatus according to claim 13, wherein the processing subsystem is arranged to determine the overall artifact severity value as the 80-percentile patch severity measure.

* * * * *

UNITED STATES PATENT AND TRADEMARK OFFICE
CERTIFICATE OF CORRECTION

PATENT NO.         : 8,243,998 B2
APPLICATION NO.    : 12/749739
DATED              : August 14, 2012
INVENTOR(S)        : Alexander Berkovich et al.

It is certified that error appears in the above-identified patent and that said Letters Patent is hereby corrected as shown below:

In column 11, lines 4-5, in Claim 12, delete "apparatus" and insert -- method --, therefor.

Signed and Sealed this
Fifteenth Day of January, 2013

David J. Kappos
*Director of the United States Patent and Trademark Office*